United States Patent Office 3,565,910
Patented Feb. 23, 1971

3,565,910
PIGMENTED FIBER-FORMING NYLON
COMPOSITION
Donald L. Elbert, Gulf Breeze, and Robert T. Wright,
Pensacola Beach, Fla., assignors to Monsanto Company, St. Louis, Mo., a corporation of Delaware
No Drawing. Continuation-in-part of application Ser. No.
541,061, Apr. 8, 1966. This application Feb. 18, 1969,
Ser. No. 800,268
Int. Cl. C08g 51/54; D01f 1/04, 7/04
U.S. Cl. 260—30.8                               4 Claims

ABSTRACT OF THE DISCLOSURE

Heat and light stabilized fiber-forming polycarbonamides containing a copper phthalocyanine and lead chromate are extruded into green fibers possessing good color stability, weathering durability and retention of physical properties. The fibers are particularly useful as pile fibers in the fabrication of synthetic turf simulating living grass.

This application is a continuation-in-part of applicants' U.S. application Serial No. 541,061, filed April 8, 1966, and now abandoned.

BACKGROUND OF THE INVENTION (1) Field of the invention

The present invention relates to green pigmented, fiber-forming, synthetic, linear polycarbonamides that are stabilized against heat and light deterioration.

(2) Description of the prior art

Various means are known in the art for stabilizing polycarbonamides against heat and light deterioration. One method which is particularly useful is the incorporation of certain additives into the nylon composition. In respect to this method attention is directed to U.S. Pats. 2,705,227 of Mar. 29, 1955, and 3,113,120 of Dec. 3, 1963; and to the U.S. patent application of Edmund P. Brignac and Robert T. Wright, Ser. No. 273,830, filed Apr. 18, 1963, entitled "Nylon Composition Resistant to Heat Deterioration." These patents and the application disclose various nylon compositions stable against heat and light deterioration as well as improvements therein. In the disclosed compositions there are present various combinations of nylon additives in amounts sufficient to achieve stabilization of the compositions. The additives present comprise a mixture of a copper compound with a halogen compound, said mixture being employed alone or in conjunction with one or more of a phosphorous compound and at least one aryl sulfonamide compound.

The first of the above-mentioned additives is a copper compound. The copper which is employed is present in the polycarbonamide in dissolved form. By "copper in dissolved form" is meant a copper compound which is dissolved in the polycarbonamide. This means one which is distributed uniformly throughout the composition. The means whereby the copper becomes dissolved in the nylon may vary. For example, by milling metallic copper into polycarbonamides a reaction occurs with the polycarbonamide whereby a soluble copper compound is formed. Thus, while "copper in dissolved form" does not include elementary copper, it does include soluble copper derived therefrom. Also inorganic and organic copper compounds yield complexes with diamines and/or polycarbonamides. The term "copper in dissolved form" embraces these various complexes no matter how produced. Application Ser. No. 273,830 and U.S. Pat. 2,705,227 disclose the specific copper compounds as well as the means for employing them and the amounts in which they are employed in the polycarbonamide compositions to achieve stabilization.

In addition to the stabilizing copper compound there is employed a halogen compound from the group consisting of hydrogen halide acids, alkali metal halides, alkaline earth metal halides, and ammonium halides. The manner in which the halogen compounds are employed in stabilizing the polyamide compositions as well as the specific compounds which are employed and the amounts in which they are employed is known to those persons skilled in the art as will be apparent upon a consideration of U.S. Pat. 2,705,227 and application S.N. 273,830.

In conjunction with the copper and halogen compounds there may, if desired, be used a phosphorous compound from the group consisting of inorganic phosphorous acids and alkali metal salts and amine salts thereof as well as aryl phosphites and phosphates and arylalkyl phosphites and phosphates.

Specifically with regard to the phosphorous compounds employed, there may be mentioned phosphorous acids as well as other various phosphorous and phosphoric compounds which are readily hydrolyzable to the acids. Particular compounds which have been found to be effective include sodium phosphites and phosphates; various alkyl phosphites and phosphates such as methyl, ethyl, propyl and butyl phosphites and phosphates; various aryl phosphites and phosphates such as triphenyl phosphite and phosphate; alkali metal aryl phosphinates and various cycloalkyl and arylalkyl phosphites and phosphates. Of particular note are the aromatic phosphinic acids as for example benzene phosphinic acid and amine salts thereof as for example the hexamethylene diamine salt. In regard to the phosphorous compounds which are employed, the means of employing such phosphorous compounds, as well as the amounts in which they are employed, reference may again be made to U.S. Pat. 2,705,227.

As indicated the additive combination of a copper compound and a halogen compound with or without the phosphorous compound, when incorporated in relatively small amounts in the polyamides increases the resistance of the same against degradation by heat and light. Generally, increasing the amount of copper up to a point proportionally increases the heat stability effect created by the presence of the copper compound in the polycarbonamide. Unfortunately when nylon containing the copper heat-stabilizing additive is extruded into a monofilament or spun into filaments by the melt-spinning technique, a quantitative level of the copper compound above about 15 parts per million (p.p.m.) cannot be steadily maintained in the filaments. If copper is added in greater amounts to the polymer, the amount of copper present in the melt-spun filaments has been found to be much less than the added amount. The added copper in excess of that present in the filaments becomes deposited on the surface of the extrusion or spinning equipment. In order to overcome this deficiency it is desirable to incorporate into the compositions containing the stabilizing mixture of additives an additional additive which is at least one aryl sulfonamide which will not react with the polycarbonamide-forming monomeric material or the polycarbonamide polymer to become a part of the polymer chain. The aryl sulfonamides which may be employed to induce copper compound retention during the melt-spinning has the following general formula:

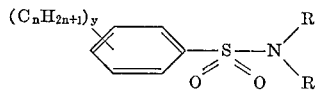

wherein R is a non-reactive monovalent radical as for example hydrogen or a hydrocarbon radical such as alkyl, aryl and cycloalkyl radicals of 1 to 8 carbon atoms; $n$ is an integer of 1 to 8 and $y$ is an integer of 0 to 3. Among the sulfonamides useful in accordance with the invention are: benzene sulfonamide; N-ethyl benzene sulfonamide; N-ethyl N'-methyl benzene sulfonamide; p-toluene sulfonamide; o-toluene sulfonamide; N-methyl-p-toluene sulfonamide, N-ethyl-o-toluene sulfonamide; N-ethyl-p-toluene sulfonamide; N,N'-diethyl-p-toluene sulfonamide; N-tertiary dodecyl p-toluene sulfonamide; N-normal butyl-p-toluene sulfonamide; N-tertiary butyl p-toluene sulfonamide; N,N'-dinormal butyl p-toluene sulfonamide; 2,3 dimethyl benzene sulfonamide; N-ethyl 2,3 dimethyl benzene sulfonamide; N-cyclohexyl-p-toluene sulfonamide and like compounds; as well as mixtures of these compounds. The amount of aryl sulfonamide compound, based upon the weight of polyamide, is usually 0.025–3.0% by weight of nylon. Preferably, this amount is about 0.1–0.8% by weight of nylon. A particularly useful mixture of aryl sulfonamides employed as an additive to the polycarbonamide is known as Santicizer–8 (SN–8), a product of Monsanto Company, of the following composition:

|  | Percent by weight |
|---|---|
| mixture of 40% N-ethyl o-toluene sulfonamide and 60% N-ethyl-p-toluene sulfonamide | 87–91 |
| mixture of 40% o-toluene sulfonamide and 60% p-toluene sulfonamide | 9–13 |

The previously described combinations of additives achieve the desired stabilization of the polycarbonamides against heat and light deterioration.

Another means of achieving stabilization of the polycarbonamides against deterioration is through the incorporation of a manganese compound, as for example manganese hypophosphite, i.e., $Mn(H_2PO_2)_2 \cdot H_2O$, into the polycarbonamide. The incorporation of such compounds is known to the art to achieve stabilization. The manner of incorporation as well as the amounts employed are also known. Such compounds can be employed alone or in conjunction with other compatible additives such as a phosphorous compound, e.g., benzene phosphinic acid or the hexamethylenediamine salt thereof.

The previously described nylon compositions containing the various specific mixtures of additives mentioned as well as other compositions possess extremely good properties in respect to heat and light stability.

Further use for these compositions is suggested by the fact that in recent years great emphasis has been placed upon producing synthetic carpet products which will simulate grass. Much inventive effort has gone into the conception and production of grass-like synthetic turf for use both indoors and outdoors in a variety of recreational and sports environments. Much of the effort which has gone into the production of this synthetic turf has involved the employment of polycarbonamide compositions. The compositions suitable for use must, of course, possess extremely good heat and light stability. Additionally such products must possess good weathering properties when subjected to continuous outdoor use. Further, of extreme importance is the fact that such polycarbonamide compositions must resemble grass as to color. In view of the propensity of nylon dyes to fading under lengthy exposure to heat and light conditions, the desired color must be achieved by pigmenting.

Although the concept of incorporating colorants into polycarbonamides is recognized in the art, the outdoor application of synthetic turf simulating natural grass and having a pile composed of fibers formed from pigmented polycarbonamides has presented coloring problems heretofore not encountered in the prior art. In outdoor applications the pigmented fibers are continually exposed to weathering, that is, sunlight, rain and dew, heat, cold, etc. Additionally, the fibers must withstand abusive use, such as that encountered in sporting events, for example, tennis and football contests. Thus, the green grass-like polycarbonamide pigmented fibers of the outdoor synthetic turf must have color stability and retain their physical properties for extended periods of time, e.g., five to ten years, while enduring the outdoor environment and abusive use to which they are subjected. Unfortunately, when pigments are incorporated into stabilized polycarbonamide fibers, they tend to accelerate the degradation of the stabilized fibers to the extent that the pigmented fibers are no longer suitable for use in fabricating synthetic turf. Also, many pigments which provide the desired fiber color initially fade or darken after only a relatively short exposure to sunlight. Neither the lack of color stability nor degradation can be tolerated in fibers used in synthetic turf.

The difficulties encountered in pigmenting stabilized polycarbonamides are complex. The effect that a pigment or mixture of pigments will have on the properties of the polycarbonamide fibers is unpredictable due in part at least to the presence of the stabilizers. In other words, the pigment may react with one or more of the stabilizers to produce either a deleterious effect or a beneficial effect with respect to the ultimate properties of the polycarbonamide fibers. Another problem that will be appreciated by those skilled in the art is that of providing a synthetic turf which simulates natural living grass, i.e., that has the appropriate color and texture.

An object of the present invention therefore is to provide a pigmented, heat and light stabilized polycarbonamide composition suitable for formation into fibers useful in producing synthetic turf simulating living grass.

Another object of the invention is to provide fibers of the character described which possess outstanding color stability and resistance to heat, light and weathering, and which retains their initial fiber properties.

Still another object of the invention is to provide polycarbonamide fibers of the character described which are useful in producing a synthetic turf simulating living grass wherein the synthetic turf is particularly suitable for use as an outdoor athletic field such as a football field, baseball field, tennis court, and the like.

SUMMARY OF THE INVENTION

The above and other objects of the invention are accomplished by providing polycarbonamide compositions that are stabilized against heat and light deterioration by one or more of the various methods known in the art and which in addition are pigmented by the incorporation therein of a pigment mixture made up of phthalocyanine pigments in conjunction with chrome yellow pigments with or without the addition of other additives such as carbon black to produce the desired color shade and a dispersing agent if desired to aid in the employment of the pigmenting mixtures.

It will of course be recognized by those persons skilled in the art that a considerable number of pigments may be employed in pigmenting polycarbonamide compositions. In order to achieve a desired shade of color resembling living grass a somewhat smaller number of pigments will be available. However, it will be apparent that a large number of pigments and mixtures thereof will be available to achieve the desired range of color. The applicants of the present invention have surprisingly discovered that the particular pigment mixture described herein when used as a pigmenting agent for the heat and light stable polycarbonamide compositions achieves superior weathering and coloring properties and possesses excellent strength retention and resistance to degradation in the ultimately formed synthetic grass products when compared with products obtained employing other pigment mixtures.

DESCRIPTION OF THE PREFERRED EMBODIMENTS

The pigment

The initial component of the pigment mixture employed in the instant invention is a member of the class of copper phthalocyanine pigments. These pigments include both the halogenated, e.g. chlorinated or fluorinated, copper phthalocyanines as well as the blue unhalogenated phthalocyanine pigments. Especially useful in the present invention are the chlorinated copper phthalocyanine pigments which are obtained by the halogenation of blue copper phthalocyanine pigments and which contain about 14 chlorine atoms in the benzene nuclei. Especially useful in this regard is Ramapo Green G, No. G–755–D manufactured by the E. I. duPont de Nemours Co. The amount of the phthalocyanine pigment employed will be dependent upon the particular polycarbonamide composition to be obtained in the ultimate product. In general the phthalocyanine pigment is employed in an amount which is from about 0.1 to about 2% by weight of the entire polycarbonamide composition.

Employed in conjunction with the phthalocyanine pigment is a chrome yellow pigment. The chrome yellow pigments are well known in the pigmenting art and are made up of the light shades (primrose and lemon) as one sub-group and the medium yellow as another sub-group. The medium yellow shade is essentially pure normal lead chromate, $PbCrO_4$. A typical chemically pure medium chrome yellow may contain 96% $PbCrO_4$. The light shade sub-group may contain minor amounts of lead sulfate, lead carbonate, or lead phosphate. The amount of the chrome yellow pigment employed will depend as in the case of the phthalocyanine pigment upon the specific polycarbonamide composition to be pigmented as well as the particular shade desired. In general the amount will be from about 0.5 to about 2% by weight of the composition.

The total pigment present in the composition will generally range from about 1 to about 3% by weight of the composition. It is, however, to be understood that these amounts may vary according to desired color changes without destroying the superior weathering properties of the compositions.

A particularly useful pigmenting mixture employed in the instant invention is one containing as pigment a coprecipitate of chrome yellow and phthalocyanine blue. As examples of such pigments there may be mentioned the Monarchrome Greens, e.g., A–4558 Monarchrome Green L, a coprecipitate containing 6% copper phthaocyanine and 94% lead chromate, marketed by Imperial Color Chemical and Paper Corporation. An advantage of such coprecipitates is that they provide extremely uniform distribution of the pigments within the pigmenting mixture.

In addition to the phthalocyanine green and chrome yellow pigments it is permissible for the pigmenting mixture to contain additional additives in minor amounts such as carbon black which is employed in order to attain the desired shade of color in the ultimately produced product. The carbon black does not appear to be essential to the attaining of superior weathering properties in the ultimately produced compositions and may therefore be omitted if desired. The carbon black thus employed may be utilized in amounts of from 0 up to 0.1% by weight of the pigmenting mixture. Also there can be employed a dispersing agent to aid in the incorporation of the pigmenting mixture into the nylon.

The polycarbonamide composition

The compositions of the present invention are prepared by intimately admixing the pigmenting mixture with the nylon concurrently with the heat and light stabilizing additives or with the previously formulated heat and light stabilized nylon composition. The particular manner in which the pigmenting mixture is incorporated into the nylon does not appear to be critical. There are, however, certain methods of incorporation of the pigmenting mixture into the nylon compositions which are more economically acceptable than others. One particularly convenient method of preparing one class of compositions of the present invention involves adding the copper compound, the halogen compound and the phosphorous compound to an aqueous solution of the polycarbonamide forming reactant, as for example, a 50% aqueous solution of the adipic acid salt of hexamethylenediamine. Polymer is then prepared from this aqueous mixture either by a continuous polymerization or a batch method by means well known to the art. A well dispersed slurry containing the desired amounts of pigment and carbon black dispersed in the aryl sulfonamide, e.g. SN–8, with a small amount of a dispersing agent is then prepared by conventional techniques to provide a flowable slurry that will not settle out an standing for short periods of time. This well dispersed pigmenting slurry is added directly to molten polymer and intimately admixed therewith to provide the compositions of the instant invention. Alternatively the nylon polymer compositions containing copper compound, halide compound and phosphorous compound are processed, cast, quenched and chipped into flake in the conventional manner. The flake is then dried to a moisture content of less than about 0.2% moisture as is usual with nylon to be processed in a conventional screw extruder. The desired pigmenting slurry previously made up is then fed to a feed hopper charged with the nylon flake at the proper rate. The mixture is melted and mixed in the extruder and a uniformly pigmented molten nylon composition is formed. The nylon compositions are then formed into the desired shape, as for example they are extruded to form a ribbon-like monofilament. This monofilament ribbon is then employed in the formation of a synthetic grass turf in accordance with carpet making procedures which are well known to those persons skilled in the art.

Particularly useful compositions provided by the instant invention are those containing:

(a) a nylon such as nylon-6 (polycaproamide) or nylon-66 (polyhexamethylene adipamide);

(b) an aryl phosphinic acid or amine salt thereof as for example benzene phosphinic acid or the hexamethylene diammonium salt thereof in an amount from 0 to about 1% calculated on the basis of acid by weight of the dry nylon forming materials, e.g., the hexamethylenediammonium adipate salt;

(c) copper in dissolved form, as for example a copper salt of an alkanoic acid, e.g., copper acetate, in an amount so that the ultimate composition and the shaped articles produced therefrom contain from about 20 to about 200 parts per million (p.p.m.) copper;

(d) a halogen compound as for example a hydrogen halide acid or an alkali metal halide, e.g., potassium bromide and potassium iodide in an amount from about 0.05 to about 5.0% by weight of the composition;

(e) at least 1 aryl sulfonamide as for example SN–8 (previously described) in an amount from 0 to about 10% by weight of the composition;

(f) a copper phthalocyanine pigment, as for example Ramapo Green G, G–775–D. E. I. du Pont de Nemours Co., in an amount which is from about 0.1 to about 2% by weight of the total composition;

(g) a chrome yellow pigment (lead chromate), as for example Shading Yellow, Y-493-D, E. I. du Pont de Nemours Co., in an amount of from about 0.5 to about 2% by weight of the total composition; and (h) a shade-producing amount of a carbon black such as for example Black Pearls "O," Cabot Corporation said amount being from about 0 to about 0.1% by weight of the composition.

In those instances where the compositions are prepared by adding the pigmenting mixture to the molten nylon or the nylon flake, the previously prepared pigmenting mixture can employ a dispersing agent such as an N-alkyl trimethylene diamine, e.g. Duomeen TDO of Armour and Co., in an amount up to about 4% by weight of pigmenting mixture.

It is to be understood that the compositions of the instant invention are not solely useful for the formation of monofilament ribbons useful in preparing synthetic grass products. Rather the compositions are generally useful in those instances where pigmented nylon compositions may be employed, as for example in molded articles and in plural filament yarns as well as in processes involving the coating of various articles with nylon compositions.

The following examples describe specific embodiments which are illustrative of the compositions of the present invention and the methods for obtaining such compositions. It is to be understood that the invention is not limited to the details of the examples presented but such examples are intended to be merely illustrative. Percent is by weight unless so indicated.

EXAMPLE I

A 50% by weight aqueous solution of the adipic acid salt of hexamethylene diamine is prepared. To this aqueous solution is added a sufficient amount of cuprous acetate to provide 50 p.p.m. copper in the ultimate nylon polymer. There is further added a sufficient amount of potassium bromide to provide 1800 p.p.m. potassium in the ultimate nylon polymer as well as the benezene phosphinic acid salt of hexamethylenediamine in an amount to provide 2,000 p.p.m. of the benzene phosphinic acid in the final nylon polymer. Nylon-66 polymer is made from the resulting solution in a conventional autoclave employing the conventional process. The nylon polymer is cast, quenched and chipped into flake in a conventional manner. The thus prepared flake is dried to a moisture content of less than 0.2% moisture as is normal with nylon to be processed in a conventional screw extruder.

A well-dispersed slurry is prepared from the following ingredients:

| | Percent |
|---|---|
| Phthalocyanine green pigment (Ramapo Green G, No. G-755-D, E. I. du Pont de Nemours Co.) | 6.0 |
| Lead Chromate (Chrome yellow pigment-shading yellow, No. Y-493-D, E. I. du Pont de Nemours Co.) | 14.4 |
| Carbon black (Black Pearls "O," Cabot Corp.) | 0.36 |
| SN-8 (previously described, Santicizer-8, Monsanto Company) | 78.14 |
| An N-alkyl trimethylene diamine pigment dispersing agent (Duomeen TDO, Armour & Co.) | 1.1 |

This slurry is made up by conventional techniques to provide a flowable slurry that will not settle out on standing for short periods of time.

The above-described nylon flake is charged to the feed hoppers of a screw extruder. The pigment slurry is injected into the feed zone of the extruder at a rate to provide 1.75% total pigment by weight of the resulting pigmented nylon polymer. This mixture is melted and mixed in the extruder and the resulting uniformly pigmented molten nylon is extruded through a spinneret to form a plurality of ribbon-like monofilaments. These filaments are quenched in a water bath, stretched three times their initial length, and wound up on spools. This mono-filament ribbon exhibits superior weathering properties when subjected to standard tests described herein as indicated by the results set forth in Table 1 appearing hereinafter.

EXAMPLE IA

A 3-ply yarn of this nylon ribbon monofilament is tufted into a standard Chemback tufting medium (Chemback is a nylon reinforced polyurethane foam carpet backing composed of an open-mesh woven nylon scrim coated with foamed polyurethane having a density of approximately 2 pounds per cubic foot and is marketed by the Chemstrand Company, Division of Monsanto Company) and is sheared to ¼" pile height with 18 ounces of nylon face yarn per square yard of fabric. A latex adhesive is applied to the underside of a portion of the fabric and a non-woven rayon-polyolefin scrim is applied to the adhesive to form a secondary backing. Samples of the synthetic turf thus produced possess good color and weathering characteristics. Negligible shedding is observed in the tufted product.

EXAMPLE IB

A 500 denier nylon monofilament ribbon 0.0018" thick by 0.04" wide and having the composition previously described is prepared by the conventional melt extrusion techniques. The ribbon is woven with an acrylic warp and fill backing on a Wilton-cut-pile loom to produce a turf fabric having 24 ounces per yard of nylon pile facing with a ⅜" pile height. The acrylic backing is woven from a 7/3's cotton count yarn spun from 3-denier, 2-inch acrylic staple, using 9 picks per inch to yield a fabric of 10 ounces per square yard. The acrylic backing is also pigmented to possess a grass-green color.

A latex solution consisting of 830 parts Lotal 7526, 173 parts Pyratex, 0.25 part D.C. Antifoam, and 14.5 parts Alcogum is padded onto the turf backing with an add-on of four ounces per square yard based on dry solids. The solution is dried at 280 degrees F. and cured at 325 degrees F. for 5 minutes.

Lotal 7526 is a compounded natural rubber latex sold by the Nagatuck Chemical Division of U.S. Rubber, Nagatuck, Conn.; Pyratex is a vinyl pyridene terpolymer also sold by Nagatuck Chemical; Dow Corning Antifoam is a silicone oil sold by Dow Corning, Midland, Mich.; and Alcogum is a sodium polyacrylate viscosity control agent sold by Alco Chemical Corp., Philadelphia, Pa.

An open cell polyvinylchloride foam having a thickness of ¼" and a density of 35 pounds per cubic foot is then cast upon the backing of the turf using conventional teechniques to form a resilient pad. In an evaluation of the turf as a covering for general playground activities it shows excellent weathering and wear properties with no shedding or matting of the nylon pile even under this very severe test.

EXAMPLE II

A well dispersed pigment slurry is prepared from the following ingredients:

| | |
|---|---|
| A co-precipated chrome yellow and phthalocyanine blue pigment composed of 6% copper phthalocyanine and 94% lead chromate (A-4558 Monarchrome Green L, Imperial Color Chemical and Paper Corp.) | 12.0 |
| SN-8 (Santicizer-8, Monsanto Co.) | 77.4 |
| Duomeen TDO dispersing agent | 0.6 |

This slurry is made by conventional techniques to provide a flowable slurry that will not settle out on standing for short periods of time.

Nylon-66 flake prepared in the manner described in Example I is charged to the feed hoppers of a screw extruder. The above indicated pigment slurry is injected into the feed zone of the extruder at a rate to provide 1.4% total pigment by weight of the resulting pigmented nylon polymer. This mixture is melted and mixed in the extruder and the resulting uniformly pigmented molten nylon is extruded through a spinneret to form a plurality of ribbon-like monofilaments. These filaments are quenched in a water bath, stretched three times their initial length, and wound up on spools.

This nylon ribbon monofilament is useful for tufting or weaving into synthetic grass products in the same manner as indicated in Example IA and IB. The monofilament exhibits superior weathering properties when subjected to tests described herein as indicated by the results shown in Table 1.

EXAMPLE III

A 50 percent by weight aqueous solution of the adipic acid salt of hexamethylenediamine is prepared. To this solution is added a sufficient amount of manganese hypophosphite $(MnH_2PO_2)_2 \cdot H_2O$ to give 1,000 p.p.m. Mn in the ultimate polymer. In addition, there is added the benzene phosphinic acid salt of hexamethylenediamine in an amount to provide 2,000 p.p.m. of the benzene phosphinic acid in the final nylon polymer. Nylon-66 polymer is made from the resulting solution in a conventional autoclave employing the conventional process. The nylon polymer is cast, quenched and chipped into flake in a conventional manner. The thus prepared flake is dried to a moisture content of less than 0.2% moisture as in normal with nylon to be processed in a conventional screw extruder.

A well dispersed pigmenting slurry is prepared from the following ingredients:

| | |
|---|---|
| A-4558 Monarchrome Green L, Imperial Color Chemical and Paper Corp. | 12.0 |
| SN-8 (Santicizer-8, Monsanto Company) | 77.4 |
| Duomeen TDO dispersing agent | 0.6 |

The slurry is made up in a conventional manner to provide a flowable slurry that will not settle out on standing for short periods of time.

The nylon flake is charged to the feed hoppers of a screw extruder. The above-described pigment slurry is injected into the feed zone of the extruder at a rate to provide 1.4% total pigment by weight of the resulting pigmented nylon polymer. The combined mixture is melted and mixed in the extruder and the resulting uniformly pigmented molten nylon is extruded through a spinneret to form a plurality of ribbon-like monofilaments. These filaments are quenched in a water bath, stretched three times their initial length, and wound up on spools.

This monofilament ribbon is useful in the formation of the synthetic grass product as described in Examples IA and IB herein. The monofilament ribbon when subjected to tests described herein to indicate the weathering propetries indicates superior stability to weather conditions as shown by the results set forth in Table 1.

In order to demonstrate the unexpected nature of the present invention, the following examples of compositions lying outside the scope of the present invention are presented. A comparison of these compositions with the compositions of the present invention is also presented in order to demonstrate the superior properties of the compositions of instant invention.

EXAMPLE IV

Nylon flake prepared as described in Example I is dried to a moisture content of less than 0.2% moisture for processing in a conventional screw extruder.

A well dispersed slurry for pigmenting of the nylon is prepared from the folowing ingredients:

| | Percent |
|---|---|
| Phthalocyanine Green Pigment (Ramapo Green No. G-755-D, E. I. du Pont de Nemours Co.) | 6.0 |
| Cadmium Yellow Pigment (No. 620 Golden Yellow, Glidden Co.) | 14.4 |
| Carbon Black (Black Pearls "O", Cobat Co.) | 0.36 |
| SN-8 (Santicizer-8. Monsanto Co.) | 78.14 |
| Duomeen TDO dispersing agent | 1.1 |

The slurry is made up using conventional techniques providing flowable slurry which does not settle out on standing for short periods of time.

The described nylon flake is charged to the feed hoppers of a screw extruder. The pigment slurry is injected into the feed zone of the extruder at a rate to provide 1.75% total pigment by weight of the resulting pigmented nylon polymer. This mixture is melted and mixed in the extruder and the resulting uniformly pigmented molten nylon is extruded through a spinneret to form a plurality of ribbon-like monofilaments. These filaments are quenched in a water bath, stretched three times their initial length, and wound up on spools.

The monofilaments thus prepared are subjected to certain tests to determine their stability under weathering conditions. The tests and results of the tests are described in connection with Table 1 appearing hereinafter.

EXAMPLE V

Nylon flake prepared as described in Example I is dried to a moisture content of less than 0.2% moisture for processing in a conventional screw extruder. The nylon flake is charged to the feed hopper of a screw extruder and the resulting unpigmented molten nylon is extruded through a spinneret to form a plurality of unpigmented ribbon-like monofilaments. These filaments are quenched in a water bath, stretched three times their initial length, and wound up on spools.

The ribbon-like monofilaments thus prepared are subjected to certain tests to determine their weathering characteristics. The tests and the results of the tests are described in connection with Table 1.

EXAMPLE VI

A 50% by weight aqueous solution of the adipic acid salt of hexamethylenediamine is made up. From 50% aqueous solution, nylon-66 polymer is prepared in a conventional autoclave employing a conventional process. The nylon polymer is cast, quenched and chipped into flake in a conventional manner. The thus prepared flake is dried to a moisture content of less than 0.2% moisture for processing in a conventional screw extruder.

The above described nylon flake is charged to the feed hopper of a screw extruder. A portion of the pigmenting slurry prepared as described in Example I is injected into the feed zone of the extruder at a rate to provide 1.75% total pigment by weight of the resulting nylon polymer. This mixture is melted and mixed in the extruder and the resulting uniformly pigmented molten nylon is extruded through a spinneret to form a plurality of ribbon-like monofilaments. These filaments are quenched in a water bath, stretched three times their initial length, and wound up on spools.

The ribbon-like monofilaments which are pigmented but do not contain the necessary heat and light stabilizing additives are subjected to certain tests to determine their weathering characteristics. These tests and the results thereof are described in connection with Table 1.

EXAMPLE VII

A 50% by weight aqueous solution of the adipic acid salt of hexamethylenediamine is prepared. Nylon-66 polymer is made from this solution in a conventional autoclave employing a conventional process. This nylon polymer is cast, quenched, chipped into flake in a conventional manner. The prepared flake is dried to a moisture content of less than 0.2% moisture for processing in a conventional screw extruder.

The above-described nylon flake which contains neither heat and light stabilizing additives nor pigmenting slurry is charged to the feed hoppers of a screw extruder. The flake is melted and the molten nylon extruded through a spinneret to form a plurality of ribbon-like monofilaments. These filaments are quenched in a water bath, stretched three times their initial length, and wound up on spools.

This monofilament ribbon is subjected to tests to determine its weathering characteristics. The tests as well as the results thereof are described in connection with Table 1.

TESTS PERFORMED

Fade-Ometer

Fade-Ometer tests were performed on a standard Fade-Ometer, Type FDAR, manufactured by Atlas Electric Devices Company, Chicago 13, Ill. This instrument is equipped with a carbon-arc light source strong in the ultra-violet region for accelerated aging of exposed samples.

The Fade-Ometer was operated substantially as prescribed in ASTM Method E 188–63T and in AATCC Method 16A–1964 (American Association of Textile Chemists and Colorists, Research Triangle Park, Durham, N.C.).

The general procedure was to prepare samples by winding the monofilament ribbon around rectangular cards of cardboard such that the flat side of the ribbon was exposed throughout the length of the filament. For strength degradation tests the sample cards measured 6½ inches by 9¾ inches.

The cards were mounted on the rotating drum rack in the Fade-Ometer such that one side only of the card was fully exposed to the radiant energy of the light source as the rack slowly rotated to insure uniformity of exposure. A sufficient number of cards of each sample were mounted on the rack so that duplicate samples were removed at the end of each exposure period. At the end of a given exposure period cards were removed from the Fade-Ometer for measurement, and the remaining cards were exposed until the end of the next period. In this manner duplicate samples exposed in each period were obtained. Degradation determinations were made by measuring the tensile properties of exposed samples of filament on a standard Instron Tester, Model TTCMM–1; similar measurements were made on unexposed samples of the same monofilament so that changes in elongation, tenacity, etc. due to exposure in the Fade-Ometer could be made.

Weather-Ometer

Fade-Ometer tests, although indicative, are not regarded as sufficiently severe nor as representative of outdoor exposure conditions as Weather-Ometer tests. The Weather-Ometer tests were performed on an Atlas Weather-Ometer, Model 60 WRC, also manufactured by Atlas Electric Devices Co., Chicago 13, Ill. This instrument was operated substantially as outlined in ASTM Method E 42–65 and more specifically as described in AATCC Tentative Test Method 16–E–1964T with water spray.

The physical structure of the Weather-Ometer is quite similar to that of the Fade-Ometer except that a Xenon arc light source with spectrum similar to natural sunlight is used together with a water mist sprayed on the samples to maintain a high humidity or wet conditions simulating extreme outdoor weather conditions.

Because of differences in local climatic conditions, especially the presence or absence of industrial waste gases, none of the accelerated aging tests in Fade-Ometers or Weather-Ometers can be expected to correlate precisely with actual usage. However, these tests are generally recognized as the most reliable of the various arbitrary tests that have been proposed for judging durability of textile materials. The U.S. Testing Co. of Hoboken, N.J. has indicated that an exposure of 300 hours in the Weather-Ometer may be taken as the equivalent of one year of exposure to outdoor weather.

Yarn samples were wound on cards and exposed in the Weather-Ometer in the same manner employed with the Fade-Ometer tests. Subsequent measurements of strength were made in the same way as in the Fade-Ometer tests.

In order to determine color degradation of the samples cards were prepared in the same way as for the strength determinations except that in the color fading tests the cards were 1⅝ inches by 2½ inches. These cards were subjected to the same treatment as the cards for determination of strength. The color change was measured by comparing the samples after treatment in the wet Weather-Ometer for 500 hours with the original sample. The results were expressed in McAdam units. In some instances the color change was so great as to be immeasurable on the same scale with other samples. A color change of as much as 10 McAdam units after 500 hours may prove to be unacceptable for applications where extremely good color stability is required.

The standard colorfastness classes commonly used for dyed textile materials fall far below the degree of colorfastness exhibited by the pigmented monofiaments of the invention. A direct measure of colorfastness is used, which is the number of hours of exposure in the Fade-Ometer or Weather-Ometer before a perceptible color change or "appreciable fading" occurs. Exposures of 40–60 standard fading hours (SFH) in the Fade-Ometer or Weather-Ometer without color change is regarded as a good level of colorfastness for common textile materials. Colorfastness beyond 300 SFH is rarely found in textile materials and is regarded as excellent.

The results of the degradation tests may be expressed in many different ways, but a special composite factor which takes into consideration both the fraction of original strength retained by the exposed filament sample and the fraction of original elongation retained is regarded as the best characterization factor of tensile properties. This composite factor is referred to as "Resistance to Degradation" (R.D.), and is defined as the geometric mean of the fraction of strength retained and the fraction of elongation retained after exposure, i.e. RD equals the square root of the product of the fraction of the strength retained and the fraction of elongation retained.

In considering the results set forth in Table 1 it is necessary to consider not only the results obtained in the Fade-Ometer but also the results in the Weather-Ometer including the color retention of each of the samples. Note especially that the monofilament ribbon of Example I possesses extremely good weathering properties. After 1,000 hours exposure in the Fade-Ometer the resistance to degradation maintained a level of .586 and after 1,000 hours exposure in the wet Weather-Ometer the resistance to degradation retained a level of .431. After 500 hours exposure in the wet Weather-Ometer the monofilament ribbons of Examples II and III exhibited a resistance to degradation of .436 and .420, respectively. These values may be compared with the monofilament ribbon of Example I, which after exposure to the wet Weather-Ometer of 500 hours exhibited a resistance to degradation of only .265. In connection with the table it should also be noticed that the color retention of Example I is 2.2 while the color retention of Examples II and III are 8.6 and 8.2, respectively. These color retention values are to be compared with the color retention of the monofilament yarns of Examples I and III for which the change is indicated to be huge. The values obtained in connection with these monofilament yarns were so great that the values were not measurable on the same scale with the results expressed in Examples I, II and III.

TABLE 1

| Example No. | Time (hrs.) | Fade-Ometer | | | Weather-Ometer | | | |
|---|---|---|---|---|---|---|---|---|
| | | Percent strength retention | Percent Elongation retention | Resistance to degradation | Percent strength retention | Percent elongation retention | Resistance to degradation (Weather-Ometer) | Color [1] retention |
| I | 60 | 100 | 100 | 1 | 92 | 100 | .959 | 2.2. |
|   | 100 | 100 | 97 | .985 | 85 | 75 | .798 | |
|   | 500 | 86 | 78 | .865 | 62 | 38 | .485 | |
|   | 1,000 | 80 | 43 | .586 | 58 | 32 | .431 | |
|   | 1,600 | 57 | 19 | .329 | | | | |
| II | 60 | 90 | 98 | .939 | 89 | 100 | .943 | 8.6. |
|   | 100 | 94 | 94 | .94 | 83 | 78 | .805 | |
|   | 500 | | | | 50 | 38 | .436 | |
| III | 60 | 82 | 55 | .672 | 90 | 85 | .874 | 8.2. |
|   | 100 | 75 | 44 | .574 | 80 | 65 | .721 | |
|   | 500 | | | | 55 | 32 | .420 | |
| IV | 60 | 92 | 75 | .830 | 85 | 66 | .749 | Huge.[2] |
|   | 100 | 86 | 61 | .724 | 75 | 47 | .594 | |
|   | 500 | | | | 39 | 18 | .265 | |
| V | 100 | 98 | 81 | .89 | No Weather-Ometer data | | | Unpigmented. |
|   | 400 | 94 | 76 | .845 | | | | |
|   | 800 | 88 | 58 | .715 | | | | |
|   | 1,600 | 84 | 50 | .648 | | | | |
| VI | 60 | 78 | 46 | .600 | 74 | 43 | .564 | Huge.[2] |
|   | 100 | 71 | 34 | .492 | 65 | 34 | .470 | |
|   | 500 | 28 | 8 | .150 | 13 | 5 | .081 | |
| VII | 50 | 80 | 64 | .715 | No Weather-Ometer data | | | Unpigmented. |
|   | 100 | 64 | 24 | .392 | | | | |
|   | 200 | 32 | 9 | .170 | | | | |
|   | 400 | 20 | 5 | .100 | | | | |

[1] Color retention is expressed as the amount of color change between original and sample exposed in wet Weather-Ometer for 500 s.f.h. Results are in McAdam units.

[2] The color change was so great that it was not measurable on the same scale (Max.=20) with the results expressed in Examples I, II and III.

EXAMPLE VIII

In this example a synthetic turf having a pile yarn prepared from the composition of the present invention was constructed and tested to demonstrate the remarkable weather durability and resistance to embrittlement possessed thereby.

The pile yarn used in the turf samples was prepared from polyhexamethylene adipamide containing 50 p.p.m. copper added as copper acetate, 1,800 p.p.m. potassium added as potassium iodide and 2,000 p.p.m. benzene phosphinic acid added as the hexamethylene diamine salt thereof according to the procedure described in Example I. The slurry employed in the instant example contained the following additives in amounts sufficient to provide a yarn containing incorporated therein the weight percentages specified:

0.480% copper phthalocyanine pigment (Ramapo Green G, No. G-755-D, E. I. du Pont de Nemours Co.).
1.200% chrome yellow pigment (Y-493-D, E. I. du Pont de Nemours Co.).
0.003% carbon black (Black Pearls "O," Cabot Corp.).
6.550% composition consisting of 87-91% of a mixture of 40% N-ethyl-o-toluene-sulfonamide and 60% N-ethyl-p-toluene sulfonamide and 9-13% of a mixture of 40% o-toluene sulfonamide and 60% p-sulfonamide (Santicizer-8, Monsanto Co.).

The turf structure conformed to the following specifications:

FABRIC COMPONENTS

| Component | Count | Material |
|---|---|---|
| Pile yarn (filaments) | Ca 500 denier | Nylon ribbon. |
| Backing yarn, warp | Ca. 2300 denier | Polyester staple spun. |
| Backing yarn, filling | do | Do. |
| Back coating | | Latex. |

Fabric Dimensions

Pile height—⅜ inch.
Filaments per inch (pile)—Warp 49; filling 60.
Tufts per inch (pile)—Warp 8.2; filling 10.0.
Ends and picks per inch (backing)—Ends 36; picks 20.

The turf was then cut into seven samples, each having the shape of a two-inch square. Six of the samples were exposed in a Xenon Arc Wet Weather-Ometer (Model 60 WRC manufactured by Atlas Electric Devices Company) as described in AATCC Method 16E-1964T for the following specified periods of time; the seventh sample was used as control and therefore was not exposed in the Weather-Ometer:

| Sample No.: | Hours of exposure |
|---|---|
| 1 | 100 |
| 2 | 200 |
| 3 | 600 |
| 4 | 1000 |
| 5 | 2000 |
| 6 | 2500 |
| 7 (control) | 0 |

Each sample after exposure as well as the control sample was subjected to 1000 cycles of punishment on the Schiefer Abrasion Testing Machine according to ASTM Method D-1175-64T, sections 42 through 50. One thousand cycles was selected since this frequency was sufficient to "knock off" embrittled fibers while insufficient to affect new or unexposed fibers. The amount of pile loss of each sample expressed as grams per four square inches of pile was determined after being subjected to the Schiefer Abrader and is given in Table 2.

TABLE 2

| Sample | Exposure, hours | Pile loss, grams per 4 square in. |
|---|---|---|
| 1 | 100 | 0.03 |
| 2 | 200 | 0.03 |
| 3 | 600 | 0.04 |
| 4 | 1,000 | 0.07 |
| 5 | 2,000 | 0.13 |
| 6 | 2,500 | 0.35 |
| 7 | 0 | 0 |

EXAMPLE IX

In this example eight synthetic turf samples were made and tested in exactly the same manner as in Example V with the exception that the slurry used in this example provided a yarn containing incorporated therein the additives in the following weight percentages. The yarn contained the same heat and light stabilizers and in the same amounts as specified in Example I.

Percent
Copper phthalocyanine pigment (Ramapo Green G, No. G-755-D) _____ 0.170
Chrome yellow pigment (Y-493-D) _____ 0.850
Carbon black (Black Pearls "O") _____ 0.024
Santicizer-8 _____ 4.900

The turf samples were each exposed in the Weather-Ometer and subjected to 1,000 cycles on the Schiefer Abrader in the same manner as were the samples of Example V. The exposure times (hrs.) of the samples in the Weather-Ometer and the pile loss for each sample is given in Table 3.

TABLE 3

| Sample No. | Exposure, hours | Pile loss, grams per 4 square in. |
|---|---|---|
| 1 | 500 | 0.03 |
| 2 | 1,000 | 0.05 |
| 3 | 1,500 | 0.05 |
| 4 | 2,000 | 0.16 |
| 5 | 2,500 | 0.08 |
| 6 | 3,000 | 0.10 |
| 7 | 3,500 | 0.20 |
| 8 | 5,000 | 0.23 |

EXAMPLE X

In this example eight turf samples were prepared and tested in exactly the same manner as in Example V and VI with the exception that the slurry used in this example provided yarn having incorporated therein the following additives including a different green pigment combination in the following weight percentages. The yarn contained the same heat and light stabilizers and in the same amount as specified in Example I.

|  | Percent |
|---|---|
| Copper phthalocyanine pigment (Ramapo Green G, No. G-755-D) | 0.580 |
| Cadmium yellow pigment (No. 620 Golden Yellow, Glidden Co.) | 1.440 |
| Carbon black (Black Pearls "O") | .040 |
| Santicizer-8 | 7.850 |

The exposure times in the Weather-Ometer and pile loss as a result of being subjected to 1000 cycles on the Schiefer Abrader are given in Table 4.

TABLE 4

| Sample No. | Exposure, hours | Pile loss, grams per 4 square in. |
|---|---|---|
| 1 | 50 | 0.2 |
| 2 | 100 | 0.2 |
| 3 | 160 | 0.2 |
| 4 | 200 | 0.2 |
| 5 | 400 | 0.22 |
| 6 | 600 | 0.43 |
| 7 | 800 | 0.90 |
| 8 | 1,000 | 1.23 |

Accelerated aging in Xenon Arc Wet Weather-Ometers is to date recognized as the most reliable of the various arbitrary tests that have been developed for judging outdoor weather durability of textile materials.

Examples VIII and IX clearly indicate the remarkable weather durability of synthetic turf pile fibers prepared from the polycarbonamide compositions of the present invention; moreover, these laboratory results were confirmed by actual outdoor exposure tests in southern Florida for a period of 13 months. Example X shows that when the pigment mixture contains a cadmium yellow pigment instead of a chrome yellow pigment the composition rapidly becomes brittle.

What is claimed is:
1. A green fiber-forming pigmented nylon composition possessing excellent color stability, strength retention and resistance to degradation comprising a nylon having incorporated therein:
 (A) from about 20–200 p.p.m. of copper in dissolved form;
 (B) from 0.05–5% by weight of a halide selected from the group consisting of sodium, potassium, magnesium and ammonium chlorides, bromides and iodides;
 (C) from 0–1% by weight of the nylon of benzene phosphinic acid;
 (D) from 0.5–2% by weight of lead chromate;
 (E) from 0.1–2% by weight of a compound selected from the group consisting of copper phthalocyanine and halogenated copper phthalocyanine; and
 (F) from 0–10% by weight of a compound of the formula

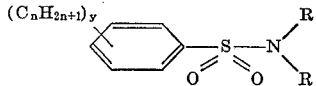

wherein R is hydrogen or a $C_1$ to $C_8$ hydrocarbon radical, $n$ is from 0–8 and $y$ is from 0–3.
2. The composition of claim 1 wherein the halogenated copper phthalocyanine is a chlorinated copper phthalocyanine.
3. The composition of claim 1 wherein the nylon is hexamethylene adipamide.
4. A monofilament ribbon prepared from the composition of claim 3.

References Cited

UNITED STATES PATENTS

| 2,279,771 | 4/1942 | Austin | 260—30.8 |
| 2,705,227 | 3/1955 | Stamatoff | 260—45.75 |
| 2,819,175 | 1/1958 | Flasch | 106—301 |
| 3,113,120 | 12/1963 | Papero et al. | 260—45.75 |
| 3,220,868 | 11/1965 | Flasch | 106—301 |
| 3,225,148 | 6/1966 | Sievenpiper et al. | 260—37N |
| 3,276,892 | 10/1966 | Pitrot | 106—298 |

FOREIGN PATENTS

| 839,712 | 6/1960 | Great Britain | 260—37N |

ALLAN LIEBERMAN, Primary Examiner

U.S. Cl. X.R.

106—288, 298; 260—37, 45.75

Disclaimer 3,565,910.—*Donald L. Elbert*, Gulf Breeze, and *Robert T. Wright*, Pensacola Beach, Fla. PIGMENTED FIBER-FORMING NYLON COMPOSITION. Patent dated Feb. 23, 1971. Disclaimer filed Jan. 5, 1971, by the assignee, *Monsanto Company*.

Hereby enters this disclaimer to the portion of the term of the patent subsequent to July 24, 1984.

[*Official Gazette December 26, 1972.*]